United States Patent [19]

Maeda

[11] Patent Number: 5,221,482
[45] Date of Patent: Jun. 22, 1993

[54] POLYPARABANIC ACID MEMBRANE FOR SELECTIVE SEPARATION

[75] Inventor: Yasushi Maeda, Himeji, Japan

[73] Assignee: Daicel Chemical Industries, Ltd., Osaka, Japan

[21] Appl. No.: 689,281

[22] PCT Filed: Oct. 16, 1989

[86] PCT No.: PCT/JP90/01331
§ 371 Date: Jun. 12, 1991
§ 102(e) Date: Jun. 12, 1991

[87] PCT Pub. No.: WO91/05602
PCT Pub. Date: May 2, 1991

[30] Foreign Application Priority Data

Oct. 16, 1989 [JP] Japan .................................. 1-264852

[51] Int. Cl.$^5$ ............................................. B01D 61/36
[52] U.S. Cl. ..................... 210/640; 210/490; 210/500.39
[58] Field of Search ..................... 210/500.39, 500.23, 210/490, 640; 55/68, 16, 158; 427/245, 386

[56] References Cited

U.S. PATENT DOCUMENTS

| | | | |
|---|---|---|---|
| 4,662,905 | 5/1987 | Matsuura et al. | 55/68 X |
| 4,882,223 | 11/1989 | Aptel et al. | 210/500.23 X |
| 4,923,718 | 5/1990 | Iida et al. | 427/386 |
| 5,017,420 | 5/1991 | Marikar et al. | 210/500.23 X |

Primary Examiner—Frank Spear
Attorney, Agent, or Firm—Weingram & Zall

[57] ABSTRACT

An organic substance can be separated or concentrated by pervaporation or vapor permeation with a selective separation membrane comprising a polyparabanic acid consisting of recurring units of the general formula:

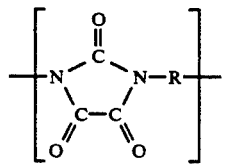

(I)

wherein R represents a divalent organic group, a blend of the polyparabanic acid with a polymer having sulfonic acid groups, or a polyparabanic acid having sulfonic acid groups and mainly comprising recurring units of the above general formula (I).

9 Claims, No Drawings

POLYPARABANIC ACID MEMBRANE FOR SELECTIVE SEPARATION

BACKGROUND OF THE INVENTION

1. Field of Industrial Application

The present invention relates to a new permselective membrane for treating water and organic substances. In particular, the present invention relates to a membrane for separating and concentrating an organic mixture or a water/organic substance mixture by ultrafiltration (UF), microfiltration (MF), pervaporation (PV) or vapor permeation (VP).

2. Prior Art

In the separation of various aqueous solutions, organic liquid mixtures and vapor mixtures, a reverse osmosis membrane, ultrafiltration membrane, dialysis membrane or dehumidifying membrane is practically used. Recently, pervaporation and vapor permeation have attracted attention as new methods for separating organic substances without being influenced by osmotic pressure.

Further, membranes which were used only for separating aqueous substances and inorganic gases in the prior art are now used also for separating organic solvents and vapors. As the solvent-resistant separating membranes capable of separating such an organic mixture, Teflon microfiltration membranes and polyamide ultrafiltration membranes (Japanese Patent Laid-Open Nos. 71785/1979 and 14908/1983) are known.

Celluloses such as cellulose acetate and aromatic polymers such as polyamides, polysulfones and polyimides are under investigation as the raw materials of pervaporation and vapor permeation membranes used typically for separating a water/alcohol mixture.

Pervaporation membranes heretofore reported for separating a water/acetic acid mixture include a copolymer membrane of acrylic acid and acrylonitrile and that of acrylic acid and styrene, "Maku (Membrane)", 10, 247 (1985); an ion-crosslinked membrane of a blend of polyacrylic acid and nylon 6, J. Appl. Polym. Sci., 35, 119 (1988); an ion-exchange membrane, "Maku (Membrane)" 13, 109 (1988)] and a membrane of a blend of polyvinyl alcohol and a hydrophilic vinyl polymer, Makromol. Chem., 188, 1973 (1987). However, the durabilities of these membranes have not yet been studied and, in addition, the separation characteristics of these membranes are not yet satisfactory.

Membranes comprising polyparabanic acid are disclosed in Japanese Patent Publication No. 46323/1983 and Japanese Patent Laid-Open Nos. 45319/1987, 91123/1988, 91124/1988 and 127029/1989. Polyparabanic acid is described in U.S. Pat. No. 3,661,859 and Japanese Patent Publication No. 19715/1972. Further, Japanese Patent Laid-Open No. 129052/1983 discloses a crosslinking composition containing polybarabanic acid and an organic sulfonic acid or its derivative as a crosslinking agent.

Membranes for separating organic substances, typified by the above-described pervaporation and vapor permeation membranes, must be resistant to not only a high operation temperature but also organic substances to be separated.

A membrane of a polysaccharide having an anionic group (Japanese Patent Laid-Open No. 129104/1985) and a crosslinked polyvinyl alcohol membrane (Japanese Patent Laid-Open No. 109204/1984) which exhibit a high separation capacity in the pervaporation separation of a water/ethanol mixture are unsuitable for the separation of various organic substances other than water/alcohol mixtures from the viewpoints of heat and solvent resistances.

DESCRIPTION OF THE INVENTION

An object of the present invention is to provide a separation membrane used for separating an organic mixture or a water/organic substance mixture which has not only a high separation capacity but also a solvent resistance sufficient for coping with organic substances of a wide range of concentration and which is resistance to a high operation temperature.

After intensive investigations on the above-described problems, the inventors have completed the present invention. Namely the present invention relates to a polyparabanic acid membrane for selective separation which has repeating units of the following general formula:

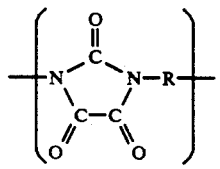

wherein R represents a divalent organic group.

Not only excellent selective separation properties but also excellent solvent and heat resistances are generally required of a membrane for separating an organic mixture or a water/organic substance mixture. After investigations of the raw materials of membranes having a high separation capacity and an excellent durability wherein a water/acetic acid mixture was employed as a model of an organic mixture to be separated and pervaporation was selected from among various separation methods, the inventors have found polyparabanic acid.

After further investigations made for the purpose of improving the separation performances of the membrane represented by separation factor and permeation rate and also imparting durability thereto, the inventors have found that it is preferably effective to blend a polymer having sulfonic acid groups in the membrane and also to heat-crosslink the membrane. The present invention has been completed on the basis of these findings.

DETAILED DESCRIPTION

The polyparabanic acid used in the present invention is represented by the following general formula:

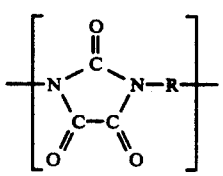

(I)

wherein R represents a divalent organic group.

The divalent organic group R may be used singly or in combination of two or more of them.

Examples of the groups R are as follows:

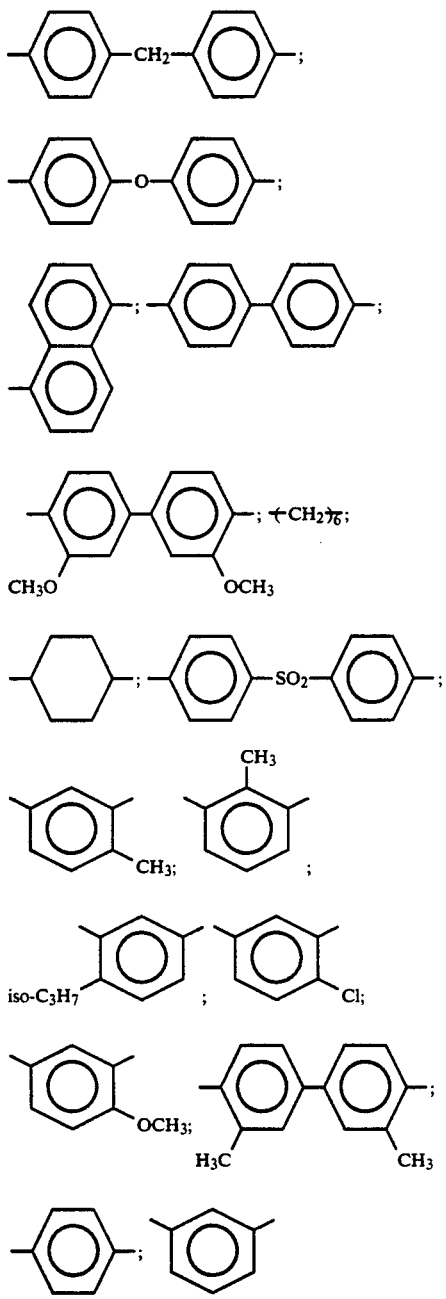

Processes for producing the polyparabanic acid are not particularly limited. They can be produced by, for example, processes disclosed in U.S. Pat. No. 3,661,859 and Japanese Patent Publication Nos. 19715/1972 and 360/1974. Eur. Polym. J., 19, (1983) (pp. 143 to 146) discloses a process for producing polyparabanic acid by the intramolecular reaction of polyurea and oxalyl chloride in the presence of pyridine as the catalyst. The urea bonds may be partially contained in the repeating units in the present invention so far as the object of the invention is not inhibited.

To improve the selectivity and water permeability in the separation of water/organic substance mixtures, it is preferred to blend the polyparabanic acid with a polymer having sulfonic acid groups ($-SO_3M$; M being H or an ion capable of forming a salt such as an alkali metal, alkaline earth metal, amine or polycation). Examples of the polymers include polystyrenesulfonic acid, polyethylenesulfonic acid and other polymers partially or wholly sulfonated with a sulfonating agent such as chlorosulfonic or fuming sulfuric acid (such as sulfonated polyphenylene oxide, polysulfone, polyamide and polyurea).

Further the polyparabanic acid per se can be sulfonated with a sulfonating agent and the sulfonated polyparabanic acid can be blended with other polymers. Thus a partially sulfonated polyparabanic acid, per se is included in the present invention. The blending ratio of the polyparabanic acid to the polymer having sulfonic acid groups is variable depending on the substance to be separated. The amount of the polymer having sulfonic acid groups is usually 1 to 40% by weight, preferably 2 to 20% by weight.

The polyparabanic acid membrane for the selective separation of the present invention preferably has a three-dimensional structure formed by crosslinking in order to improve the strength and separation capacity of the membrane.

The membrane formed is heated to a temperature of 200° to 400° C. preferably 250° to 350° C. or a temperature not higher than its glass transition point to form a crosslinked structure, thereby attaining the purpose.

The membrane thus formed is used for the separation of various organic mixtures and water/organic substance mixtures by pervaporation (PV) separation or vapor permeation (VP) separation. Examples of the organic substances include organic acids such as formic, acetic and butyric acids, alcohols such as methanol, ethanol, 1-propanol, 2-propanol and n-butanol, ketones such as acetone and methyl ethyl ketone, ethers such as tetrahydrofuran and dioxane, and amines such as pyridine and picoline.

The polyparabanic acid membrane for selective separation is usable also as a permselective membrane for the treatment of various organic substances, water and ions, taking advantage of its characteristic properties. The membrane would be usable as a dialysis membrane, reverse osmosis membrane, ultrafiltration membrane, microfiltration membrane or the like. It is usable also as the raw material of a base membrane of membrane of membranes for gas separation, or RO, PV, or VP composite membrane, taking advantage of excellent heat and solvent resistances thereof.

The membrane of the present invention can be used in the form of a flat film, tube or hollow fiber. The flat membranes can be directly put together to form a laminate or they can be pleated or made spiral to form a module. To increase the permeation rate, it is usually preferred to reduce the thickness of the membrane. For this purpose, the membrane is used in the form of an asymmetric membrane formed by the phase inversion method or the like or a composite membrane formed by coating a support (base membrane) therewith.

In the gas separation, pervaporation or vapor permeation, it is preferred that the separation-active layer of the asymmetric or composite membrane be substantially nonporous (i.e. no pores being observable with an electron microscope of 10,000 x magnifications) and having a thickness of not more than 10 μm. When the membrane is in the form of a hollow fiber it is preferred that only one surface of the fiber have the separation-active layer and the other surface is porous (at least 0.1 μm.) so as to keep the permeation resistance low.

The pore diameter and thickness of the separation-active layer of the separation membrane for RO, UF and MF must be varied depending on the substance to be separated. The flat membrane, hollow filament, etc., can be produced from the membrane-forming polymer solution containing additives by a known method such as the phase conversion method.

The polyparabanic acid membrane for selective separation according to the present invention has not only a high capacity of separating organic substances or water/organic substances mixtures. The membrane is practically effective for membrane separation processes such as pervaporation and vapor permeation.

ration performances of the immersed film are given in Table 1.

EXAMPLE 5

The pervaporation separation of a water/ethanol mixture was conducted with the same film of MF grade as that used in Example 1. The feed was 90 wt. % ethanol at 60° C. The results are given in Table 1.

EXAMPLE 6

The separation performances of the same film of TMF grade as that used in Example 2 were determined in the same manner as that of Example 5. The results are given in Table 1.

TABLE 1

| Ex. No. | Feed | Conc. (wt. %) | Temp. of feed (°C.) | Separation factor α | Permeation velocity Q(kg/m² · h) | Film thickness (μm.) |
|---|---|---|---|---|---|---|
| 1 | acetic acid | 80 | 70 | 30.1 | 0.027 | 30 |
| 2 | acetic acid | 80 | 70 | 97.5 | 0.012 | 30 |
| 3 | acetic acid | 80 | 70 | 55.0 | 0.036 | 30 |
| 4 | acetic acid | 80 | 70 | 50.0 | 0.049 | 30 |
| 5 | ethanol | 90 | 60 | 241 | 0.010 | 30 |
| 6 | ethanol | 90 | 60 | 194 | 0.011 | 30 |

EXAMPLES

The following examples will further illustrate the present invention.

The separation factor was calculated according to the following formula:

$$\alpha = (X/Y)_p/(X/Y)_f$$

wherein X represents the concentration of water, Y represents the concentration of acetic acid or ethanol, and p and f represent the permeation side and feeding side, respectively.

EXAMPLE 1

The water/acetic acid pervaporation performances of a polyparabanic acid film (mfd. by Tonen Sekiyukagaku K.K.) of MF grade (glass transition temperature: 290° C.) mainly comprising poly (2,4,5-trioxo-1,3-imidazolidinediyl-1,4-phenylenemethylene-1,4-phenylene were determined. The feed was 80 wt. % acetic acid at 70° and the pressure reduction on the secondary side was around 1 mm Hg. Water preferentially permeated. The results are given in Table 1.

EXAMPLE 2

The same performances of a polyparabanic acid film (mfd. by Tonen Sekiyukagaku K.K.) of TMF grade (glass transition temperature: 350° C.) mainly comprising poly (2,4,5-trioxo-1,3-imidazolidinediyl)-2,4-tolylene were determined in the same manner as that of Example 1. The results are given in Table 1.

EXAMPLE 3

The same film of MF grade as that used in Example 1 was immersed in 80 wt. % acetic acid at 60° C. for 35 days and the water/acetic pervaporation performances thereof were determined in the same manner as that of Example 1. The results are given in Table 1.

EXAMPLE 4

The same film of TMF grade as that used in Example 2 was immersed in 80 wt. % acetic acid at 60° C. for 51 days. No change in the shape of the film was observed as in the case of the membrane of MF grade. The sepa-

EXAMPLE 7

A polyparabanic acid solution XT-0702 (mfd. by Tonen Sekiyukagaku K.K.) (corresponding to TMF grade of Example 2) was diluated to a 10 wt. % solution with dimethylformamide. It was cast with an applicator on a glass plate to form a film having a thickness of 17 μm. The film was vacuum-dried at 100° C. overnight and then at 200° C. for 6 h. The water/acetic acid pervaporation performances of the resulting film are given in Table 2.

EXAMPLE 8

The film produced in Example 7 was further heat-treated at 250° C. for 2 hours. The separation performances of the film is given in Table 2.

EXAMPLE 9

The film produced in Example 7 was further heat treated at 300° C. for 2 hours. Since the film was heat-crosslinked, it was insoluble any more in dimethylformamide. The separation performances of the film are given in Table 2.

EXAMPLE 10

2,5-Diaminobenzenesulfonic acid was reacted with p-phenylene diisocyanate in equimolar amounts in dimethylformamide to give the following polyurea having sulfonic acid groups:

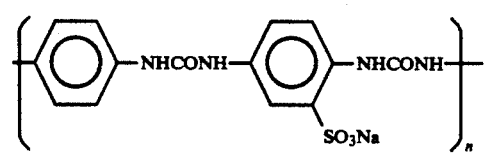

The polyurea was blended with the same polyparabanic acid solution as that used in Example 7 in such an amount that it would be 8.8% by weight based on the total polymer in the solution. The blend thus obtained was cast on a glass plate to form a film having a uniform thickness of 18 μm. The film was heat-treated at 100° C.

overnight and then at 200° C. for 6 h. The separation performances of the film are given in Table 2.

EXAMPLE 11

The film produced in Example 10 was further heat treated at 250° C. in a vacuum for 2 hours. The separation performances of the film are given in Table 2.

EXAMPLE 12

The film produced in Example 10 was further heat-treated at 300° C. in a vacuum for 2 hours. Since the film was heat- crosslinked, it was insoluble any more in dimethylformamide. The separation performances of the film are given in Table 2.

EXAMPLE 13

The same polyurea having sulfonic acid groups as that used in Example 10 was blended with the same polyparabanic acid solution as that used in Example 7 in such an amount that it would be 16.4% by weight based on the total polymer in the solution. A film having a uniform thickness was produced therefrom in the same manner as that of Example 10. The film was vacuum-dried at 250° C. for 2 hours. The separation performances of the film are given in Table 2.

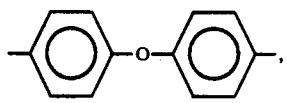

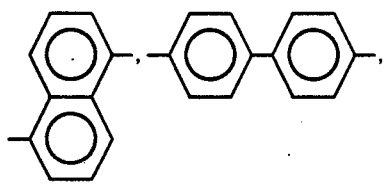

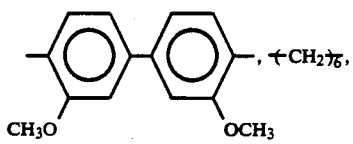

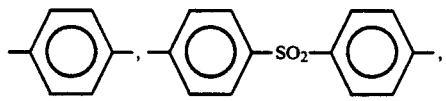

TABLE 2

| Ex. No. | Feed | Conc. (wt. %) | Temp. of feed (°C.) | Separation factor α | Permeation velocity Q(kg/m²·h) | Film thickness (μm.) |
|---|---|---|---|---|---|---|
| 7 | acetic acid | 80 | 70 | 35 | 0.155 | 17 |
| 8 | acetic acid | 80 | 70 | 91 | 0.036 | 15 |
| 9 | acetic acid | 80 | 70 | 53 | 0.024 | 18 |
| 10 | acetic acid | 80 | 70 | 22 | 0.225 | 18 |
| 11 | acetic acid | 80 | 70 | 72 | 0.057 | 16 |
| 12 | acetic acid | 80 | 70 | 176 | 0.032 | 16 |
| 13 | acetic acid | 80 | 70 | 105 | 0.061 | 14 |

I claim:

1. A selective separation membrane comprising a crosslinked polyparabanic acid which is produced by:
   (a) forming a selective separation membrane comprising:
   (i) a polyparabanic acid consisting of recurring units of the general formula:

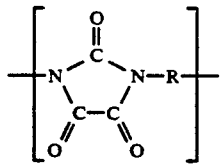

FORMULA I wherein R represents a divalent organic group;
   (ii) a blend of the polyparabanic acid with a polymer having sulfonic acid groups; or
   (ii) a polyparabanic acid having sulfonic acid groups and mainly comprising recurring units of the above general formula (I): and then
   (b) heat-treating the membrane at a temperature of at least 200° C. or above.

2. The process of claim 1, wherein R is selective from group consisting of

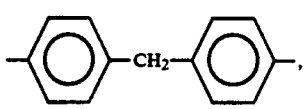

FORMULA III

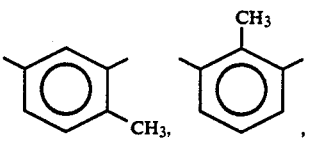

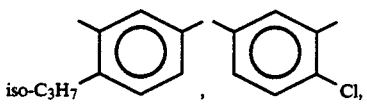

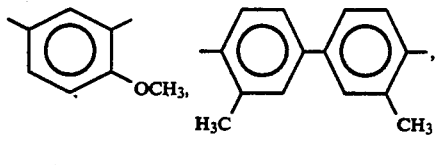

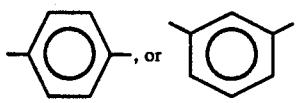

3. A composite membrane comprising a base membrane comprising the crosslinked polyparabanic acid of claim 1 and a thin membrane covering the base membrane.

4. A process for separating and concentrating an organic substance by pervaporation or vapor permeation comprising using the composite membrane of claim 3.

5. A process for separating or concentrating an organic substance by pervaporation or vapor permeation using a selective separation membrane comprising:
 (a) a polyparabanic acid consisting of repeating units of the general formula:

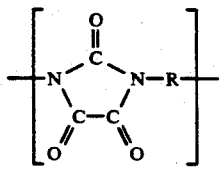
Formula I wherein R represents a divalent organic group;
 (b) a blend of the polyparabanic acid with a polymer having sulfonic acid groups; and
 (c) a polyparabanic acid having sulfonic acid groups which mainly comprises recurring units of formula (I);

said membrane having been heat treated at a temperature of at least about 200° C. for a time period sufficient to form a cross-linked structure.

6. The process of claim 5, wherein R is selective from group consisting of:

FORMULA III

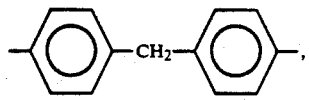

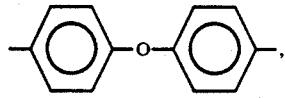

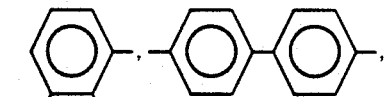

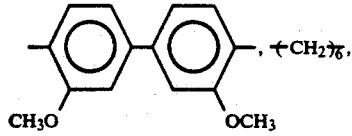

-continued

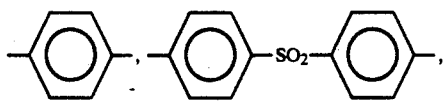

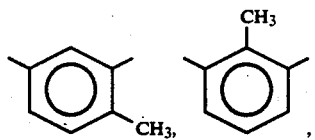

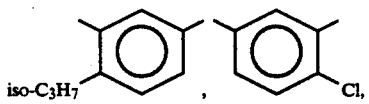

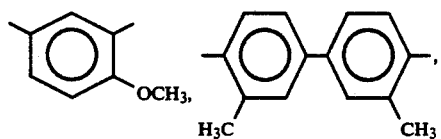

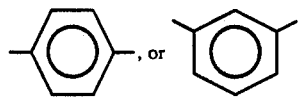

7. The process of claim 5, wherein the polyparabanic acid comprises recurring units of the formula:

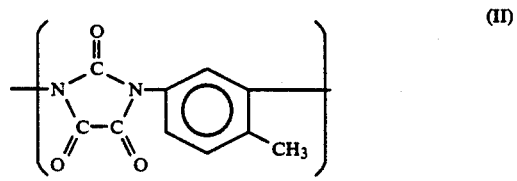
(II)

8. The process of claim 5, wherein the polymer having sulfonic acid groups which is to be blended is sulfonated polyurea.

9. The process of claim 5, wherein polyparabanic acid comprises recurring units of the formula:

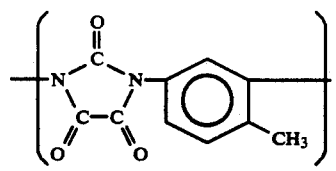
(II)

and the polymer having sulfonic acid groups which is to be blended is sulfonated polyurea.

* * * * *